Nov. 7, 1939. J. D. GABRIEAU 2,178,889
COMBINATION PEELER, BEATER, AND SLICING MACHINE
Filed April 11, 1938 2 Sheets-Sheet 1
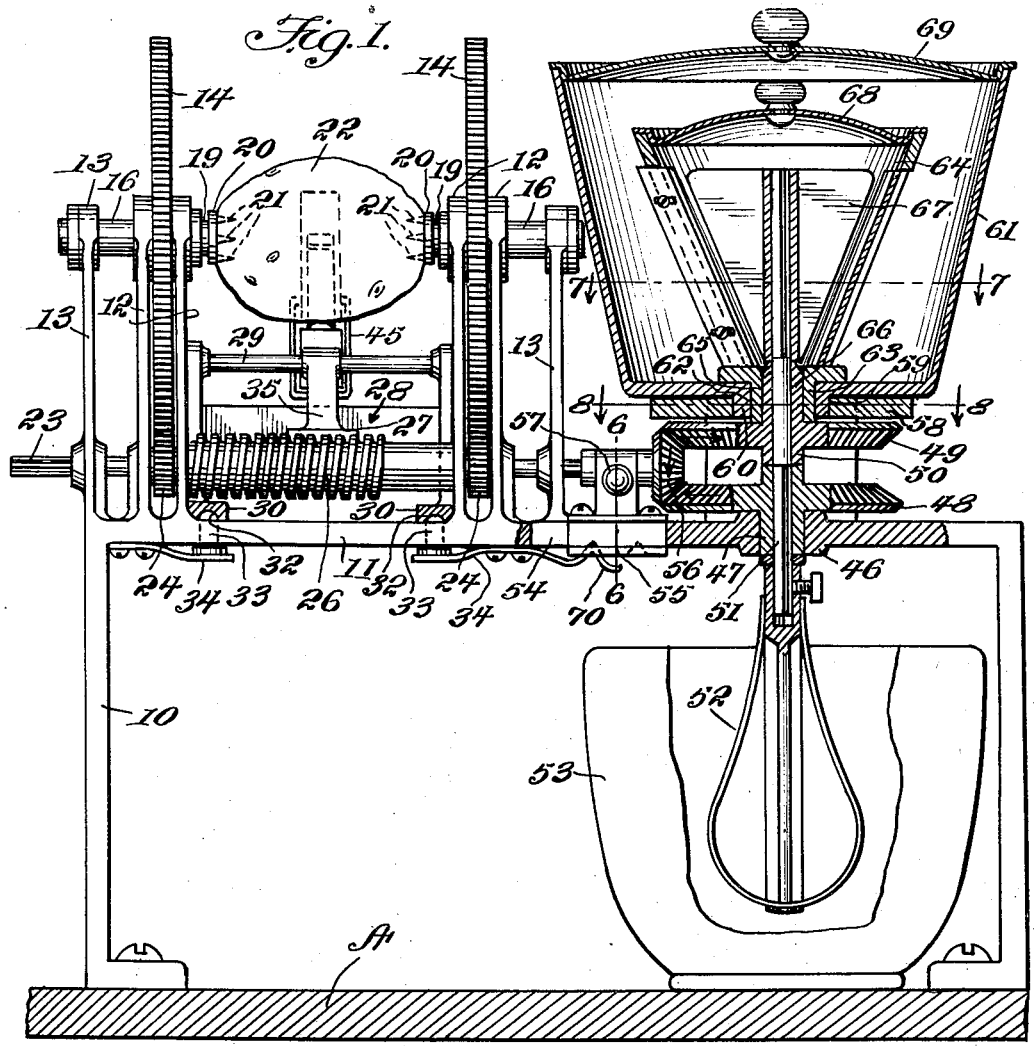
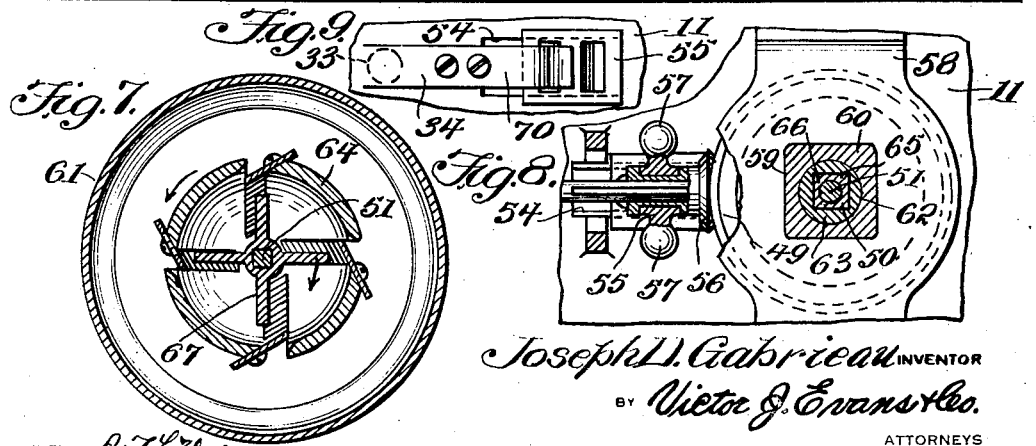
Joseph D. Gabrieau INVENTOR Nov. 7, 1939.  J. D. GABRIEAU  2,178,889
COMBINATION PEELER, BEATER, AND SLICING MACHINE
Filed April 11, 1938  2 Sheets-Sheet 2
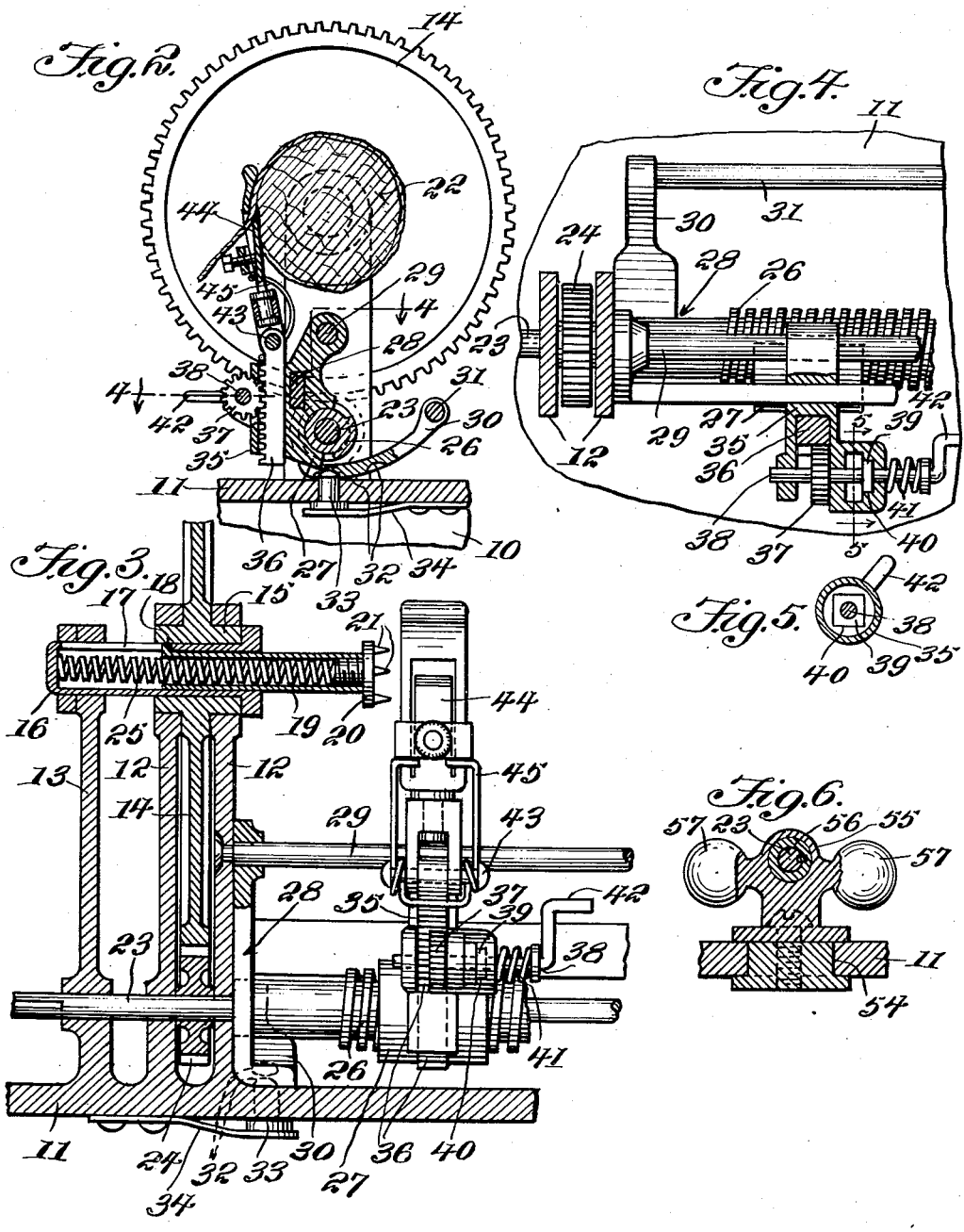
Joseph D. Gabrieau
INVENTOR
BY Victor J. Evans & Co.
ATTORNEYS
WITNESS J. L. Wright Patented Nov. 7, 1939

2,178,889

UNITED STATES PATENT OFFICE 2,178,889

COMBINATION PEELER, BEATER, AND SLICING MACHINE

Joseph D. Gabrieau, Tacoma, Wash.

Application April 11, 1938, Serial No. 201,391

9 Claims. (Cl. 146—43)

The invention relates to a handy culinary machine and more especially to a combined vegetable and fruit peeler, beater and slicing machine.

The primary object of the invention is the provision of a machine of this character, wherein potatoes, fruits or the like can be automatically peeled and simultaneously operated therewith is a beater and slicer, the peeler being selectively operative independently of the beater and slicer thus eliminating hand labor for such operations.

Another object of the invention is the provision of a machine of this character, wherein the construction thereof is novel in its entirety and in which three distinct operations can be carried out, namely, peeling, beating and slicing operations.

A further object of the invention is the provision of a machine of this character, which is simple in its construction, thoroughly reliable and effective in operation, readily and easily controlled, automatic in the working thereof and inexpensive to manufacture.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 1 is an elevation partly in section of a machine constructed in accordance with the invention.

Figure 2 is a fragmentary vertical transverse sectional view through one portion of the machine.

Figure 3 is a fragmentary vertical longitudinal sectional view.

Figure 4 is a sectional view taken on the line 4—4 of Figure 2 looking in the direction of the arrows.

Figure 5 is a sectional view taken on the line 5—5 of Figure 4 looking in the direction of the arrows.

Figure 6 is a sectional view taken on the line 6—6 of Figure 1 looking in the direction of the arrows.

Figure 7 is a sectional view on the line 7—7 of Figure 1 looking in the direction of the arrows.

Figure 8 is a sectional view on the line 8—8 of Figure 1 looking in the direction of the arrows.

Figure 9 is a fragmentary elevation of the peeler adjunct.

Similar reference characters indicate corresponding parts throughout the several views in the drawings.

Referring to the drawings in detail, A designates generally a portion of a bed, table top or other horizontal support, while upon and rising vertically therefrom is an open frame 10, its top 11 being formed with inner and outer spaced bearing posts 12 and 13, respectively, these inner posts 12 have arranged therebetween in their pair disposition gear wheels 14, each having its hub 15 made fast to a tubular guide barrel or hollow shaft 16 having a longitudinally disposed slot 17 in which engages a nib 18 extended outwardly from a plunger-like tubular stem 19. The nib 18 is for the purpose of preventing the turning of the stem 19 within the barrel or shaft 16 while the slot 17 receiving the nib allows displacement of the stem telescopically within the barrel or shaft 16.

It is, of course, understood that there is employed a pair of stems 19, these being arranged opposite to each other in longitudinal alignment one with the other and on the confronting ends of the said stems 19 are disk-like heads 20 having biting spurs 21 distributed in circular arrangement thereon so that a vegetable or fruit, in this instance there being shown a potato 22, can be readily gripped and held fast between the heads for automatic peeling of such potato in a manner presently described.

Journaled in the bearings 12 and 13 at a point below the gears 14 in parallel relation to the top 11 of the frame 10 is a power shaft 23 driven from any suitable source either manually or mechanically and has fixed thereto pinions 24, these meshing with the gears 14 so that when the shaft 23 rotates motion is transmitted through the gears and pinions to the heads 20 for the turning of the potato 22 thereby.

The stems 19 at the head ends 20 are urged toward each other under the influence of a spring 25 incased by the barrel or shaft 16 and its companion stem so that the potato 22, for example, can be readily and firmly gripped by the spurs 21 for the secure holding of the potato and at the same time the later can be separated from between the heads 20 when required.

Formed on the power shaft 23 is a feed screw 26 having threaded therewith and thereon an advancing collar or sleeve 27 slidably interfitted with a vertically swinging cradle 28 having suspension from a turning arbor 29 fitted in the innermost bearing 12 below the barrels or shafts 16. This cradle 28 is formed with curvilinear arms 30 fitted with a handle bar 31, the said arms 30 being formed with keeper notches 32 selectively engageable by locking pins 33 yieldably held under tension by leaf springs 34 suitably fitted in the frame 10, the pins being adapted to work through clearances in the top 11 of the said frame for engagement in the notches 32 and in this manner the cradle can be latched in a shifted position under arcuate swing thereof.

The feed collar or sleeve 27 is formed with a guide post 35 slidably engaged on the arbor 29 for the cradle, the feed screw 26 being adapted to impart movement to the collar or sleeve 27. The post 35 has fitted therein a rack 36 engageable with a rack pinion 37 carried upon an arbor 38 journaled and slidably associated with the post 35. The arbor 38 has fixed thereto a flat faced latching nut 39 for accommodation in a correspondingly shaped seat 40, the nut 39 being normally held in the seat 40 under the action of a spring 41 coiled about the arbor 38 and active for holding the rack 36 in an adjusted raised or lowered position. The arbor 38 has a crank handle 42 for manual turning so that the rack 36 may be raised and lowered when the nut 39 is moved out of the seat 40 in that this nut when seated locks the rack 36.

Supported by the rack 36 at the upper end and working on a horizontal pintle hinge 43 is an adjustable peeler blade 44 having acting against the same a presser spring 45 so that the blade will be held against the potato 22 and angled to its outer surface for the peeling of such potato under progression of the post 35 activated by the screw 26. The collar or sleeve 27 is of a half cylindrical formation so that by shifting the cradle 28, the said post 35 can be released in that the collar or sleeve 27 disengages from the screw 26 and this permits of the resetting of the peeler blade 44 when the sleeve 27 is advanced by the screw 26 to the limit of the threads in the advancing direction.

To one side of the bearings 12 and 13 and extended through the top 11 of the frame 10 in a bearing 46 is the hub 47 of a driven beveled gear 48 while superposed to the latter is another beveled gear 49 having the hub 50, these hubs 47 and 50 being fitted upon an upstanding coupling shaft 51. The gear 48 is fixed to the shaft 51 while the gear 49 is free thereon. The shaft 51 extends into the frame 10 and detachably secured thereto is a depending beater 52 for operation within a bowl 53 at rest upon the support A. To one side of the gears 48 and 49 and slidable in a guide slot 54 in the top 11 of the frame 10 is a shift bearing 55 in which is journaled a beveled pinion 56 splined for sliding movement on the power shaft 23 and such pinion 56 through movement of the bearing 55 can be brought into and out of mesh with the gears 48 and 49 and when enmesh reversely turns the said gears. The gear 48 when in motion operates the beater. The bearing 55 has formed therewith oppositely extending hand grips 57 for manual control thereof. When the pinion 56 is out of mesh with the gear 48, the beater 52 is passive.

The bowl 53 accommodates the material to be acted upon by the beater 52 when active.

Overlying the gears 48 and 49 is a bridge 58 having a squared opening 59 accommodating a squared holding protuberance or projection 60 depending centrally from the bottom of a receptacle 61, which is superimposed upon the bridge 58, and this protuberance or projection 60 has a circular socket or hole 62 therein for accommodating a correspondingly shaped coupling end 63 of an inverted substantially cone-shaped multiple blade slicer 64 operating within the receptacle 61. This coupling 63 has a squared socket 65 for the correspondingly squared extension portion 66 of the hub 50 of the gear 49 so that when the said gear is active the slicer 64 will be rotated and driven within the receptacle 61. The purpose of the slicer 64 within the receptacle is to slice and cut materials placed therein. The slicer 64 is readily separable from the hub of the gear 49 and from within the receptacle 61 while the receptacle 61 can be disengaged from the bridge 58.

The slicer 64 interiorly thereof carries a bladed agitator 67, there being a removable lid 68 fitting said slicer 64, and similarly the receptacle 61 carries a removable lid 69.

The shift bearing 55 is held in two positions by a leaf spring latch 70 suitably fastened in the frame 10 so that the pinion 56 can be locked out of mesh or enmesh with the gears 48 and 49, the bearing 55 being shifted by the hand grips 57 manually.

What is claimed is:

1. A machine comprising a supporting frame having a top, bearings rising from said frame at its top, a pair of gears journaled spaced from each other in certain of said bearings, tubular turning barrels fitted centrally to said gears and disposed opposite each other, stems slidably fitting said barrels and rotatable with the gears, spurred circular heads carried by said stems for gripping a vegetable or fruit therebetween, a power shaft journaled in said bearings and having a feed screw, pinions fixed to the power shaft and meshing with said gears, a cradle vertically swingable beneath the heads, a feed collar supported by said cradle and engageable with the said screw and having a rack guide, a rack adjustably fitted in said guide, a blade peeling device supported by the rack and adjustable therewith, and means for holding the cradle in a position to have the feed collar engaged with or disengaged from the feed screw.

2. A machine comprising a supporting frame having a top, bearings rising from said frame at its top, a pair of gears journaled spaced from each other in certain of said bearings, tubular turning barrels fitted centrally to said gears and disposed opposite each other, stems slidably fitting said barrels and rotatable with the gears, spurred circular heads carried by said stems for gripping a vegetable or fruit therebetween, a power shaft journaled in said bearings and having a feed screw, pinions fixed to the power shaft and meshing with said gears, a cradle vertically swingable beneath the heads, a feed collar supported by said cradle and engageable with the said screw and having a rack guide, a rack adjustably fitted in said guide, a bladed peeling device supported by the rack and adjustable therewith, means for holding the cradle in a position to have the feed collar engaged with or disengaged from the feed screw, and means for tensioning the bladed peeling device.

3. A machine comprising a supporting frame having a top, bearings rising from said frame at its top, a pair of gears journaled spaced from each other in certain of said bearings, tubular turning barrels fitted centrally to said gears and disposed opposite each other, stems slidably fitting said barrels and rotatable with the gears, spurred circular heads carried by said stems for gripping a vegetable or fruit therebetween, a power shaft journaled in said bearings and having a feed screw, pinions fixed to the power shaft and meshing with said gears, a cradle vertically swingable beneath the heads, a feed collar supported by said cradle and engageable with the said screw and having a rack guide, a rack adjustably fitted in said guide, a bladed peeling device supported by the rack and adjustable therewith, means for holding the cradle in a position to have the feed collar engaged with or disengaged from the feed screw, means for tensioning the bladed peeling device, and means for adjusting the rack and locking it in adjusted position.

4. A machine comprising a supporting frame having a top, bearings rising from said frame at its top, a pair of gears journaled spaced from each other in certain of said bearings, tubular turning barrels fitted centrally to said gears and disposed opposite each other, stems slidably fitting said barrels and rotatable with the gears, spurred circular heads carried by said stems for gripping a vegetable or fruit therebetween, a power shaft journaled in said bearings and having a feed screw, pinions fixed to the power shaft and meshing with said gears, a cradle vertically swingable beneath the heads, a feed collar supported by said cradle and engageable with the said screw and having a rack guide, a rack adjustably fitted in said guide, a bladed peeling device supported by the rack and adjustable therewith, means for holding the cradle in a position to have the feed collar engaged with or disengaged from the feed screw, means for tensioning the bladed peeling device, means for adjusting the rack and locking it in adjusted position, and a slicer means operative by said power shaft to slice the said vegetable or fruit.

5. A machine comprising a supporting frame having a top, bearings rising from said frame at its top, a pair of gears journaled spaced from each other in certain of said bearings, tubular turning barrels fitted centrally to said gears and disposed opposite each other, stems slidably fitting said barrels and rotatable with the gears, spurred circular heads carried by said stems for gripping a vegetable or fruit therebetween, a power shaft journaled in said bearings and having a feed screw, pinions fixed to the power shaft and meshing with said gears, a cradle vertically swingable beneath the heads, a feed collar supported by said cradle and engageable with the said screw and having a rack guide, a rack adjustably fitted in said guide, a bladed peeling device supported by the rack and adjustable therewith, means for holding the cradle in a position to have the feed collar engaged with or disengaged from the feed screw, means for tensioning the bladed peeling device, means for adjusting the rack and locking it in adjusted position, a slicer means operative by said power shaft to slice the said fruit or vegetable, and means for separating the slicer means from the power shaft.

6. A machine comprising a supporting frame having a top, bearings rising from said frame at its top, a pair of gears journaled spaced from each other in certain of said bearings, tubular turning barrels fitted centrally to said gears and disposed opposite each other, stems slidably fitting said barrels and rotatable with the gears, spurred circular heads carried by said stems for gripping a vegetable or fruit therebetween, a power shaft journaled in said bearings and having a feed screw, pinions fixed to the power shaft and meshing with said gears, a cradle vertically swingable beneath the heads, a feed collar supported by said cradle and engageable with the said screw and having a rack guide, a rack adjustably fitted in said guide, a bladed peeling device supported by the rack and adjustable therewith, means for holding the cradle in a position to have the feed collar engaged with or disengaged from the feed screw, means for tensioning the bladed peeling device, means for adjusting the rack and locking it in adjusted position, a slicer means operative by said power shaft to slice the said fruit or vegetable, means for separating the slicer means from the power shaft, and a beater means to slice the said fruit or vegetable cooperative with the power shaft and operating in conjunction with the said slicer means.

7. A machine comprising a supporting frame having a top, bearings rising from said frame at its top, a pair of gears journaled spaced from each other in certain of said bearings, tubular turning barrels fitted centrally to said gears and disposed opposite each other, stems slidably fitting said barrels and rotatable with the gears, spurred circular heads carried by said stems for gripping a vegetable or fruit therebetween, a power shaft journaled in said bearings and having a feed screw, pinions fixed to the power shaft and meshing with said gears, a cradle vertically swingable beneath the heads, a feed collar supported by said cradle and engageable with the said screw and having a rack guide, a rack adjustably fitted in said guide, a bladed peeling device supported by the rack and adjustable therewith, means for holding the cradle in a position to have the feed collar engaged with or disengaged from the feed screw, means for tensioning the bladed peeling device, means for adjusting the rack and locking it in adjusted position, a slicer means operative by said power shaft to slice the said fruit or vegetable, means to manually disengage the slicer means from the power shaft, and resilient means to maintain the slicer means disengaged from the said power shaft.

8. A machine comprising a supporting frame having a top, bearings rising from said frame at its top, a pair of gears journaled spaced from each other in certain of said bearings, tubular turning barrels fitted centrally to said gears and disposed opposite each other, stems slidably fitting said barrels and rotatable with the gears, spurred circular heads carried by said stems for gripping a vegetable or fruit therebetween, a power shaft journaled in said bearings and having a feed screw, pinions fixed to the power shaft and meshing with said gears, a cradle vertically swingable beneath the heads, a feed collar supported by said cradle and engageable with the said screw and having a rack guide, a rack adjustably fitted in said guide, a bladed peeling device supported by the rack and adjustable therewith, means for holding the cradle in a position to have the feed collar engaged with or disengaged from the feed screw, means for tensioning the bladed peeling device, means for adjusting the rack and locking it in adjusted position, a means for slicing the said fruit or vegetable, gear means slidably carried by the said power shaft and normally actuating the said slicing means, means to move the gear means out of engagement with the said slicer and means to secure the said gear means in the last-named position.

9. A machine comprising a supporting frame having a top, bearings rising from said frame at its top, a pair of gears journaled spaced from each other in certain of said bearings, tubular turning barrels fitted centrally to said gears and disposed opposite each other, stems slidably fitting said barrels and rotatable with the gears, spurred circular heads carried by said stems for gripping a vegetable or fruit therebetween, a power shaft journaled in said bearings and having a feed screw, pinions fixed to the power shaft and meshing with said gears, a cradle vertically swingable beneath the heads, a feed collar supported by said cradle and engageable with the said screw and having a rack guide, a rack adjustably fitted in said guide, a bladed peeling device supported by the rack and adjustable therewith, means for holding the cradle in a position to have the feed collar engaged with or disengaged from the feed screw, means for tensioning the bladed peeling device, means for adjusting the rack and locking it in adjusted position, a means for slicing the said fruit or vegetable, an agitator carried by the said supporting frame, gear means slidably carried by the said power shaft and normally actuating the slicing means and the said agitator, means to move the said gear means out of engagement with the slicing means and agitator, and means to secure the said gear means in the last-named position.

JOSEPH D. GABRIEAU.